(12) United States Patent
Goldsmith

(10) Patent No.: US 9,148,019 B2
(45) Date of Patent: Sep. 29, 2015

(54) COMPUTING ARCHITECTURE FOR AUTONOMOUS MICROGRIDS

(75) Inventor: Steven Y. Goldsmith, Rochester, MN (US)

(73) Assignee: Sandia Corporation, Albuquerque, NM (US)

( * ) Notice: Subject to any disclaimer, the term of this patent is extended or adjusted under 35 U.S.C. 154(b) by 603 days.

(21) Appl. No.: 13/241,054

(22) Filed: Sep. 22, 2011

(65) Prior Publication Data

US 2012/0143385 A1 Jun. 7, 2012

Related U.S. Application Data

(60) Provisional application No. 61/419,966, filed on Dec. 6, 2010.

(51) Int. Cl.
*G05D 11/00* (2006.01)
*H02J 3/38* (2006.01)

(52) U.S. Cl.
CPC .. *H02J 3/38* (2013.01); *H02J 3/382* (2013.01); *H02J 3/383* (2013.01); *H02J 3/386* (2013.01); *Y02E 10/563* (2013.01); *Y02E 10/763* (2013.01)

(58) Field of Classification Search
CPC ........................................................ G06F 1/00
USPC ........................................ 700/297; 703/2, 18
See application file for complete search history.

(56) References Cited

U.S. PATENT DOCUMENTS

| | | | |
|---|---|---|---|
| 7,983,799 B2 | 7/2011 | Bose et al. | |
| 7,991,512 B2 * | 8/2011 | Chandra et al. | 700/291 |
| 8,140,194 B2 * | 3/2012 | Iino et al. | 700/295 |
| 2003/0011348 A1 | 1/2003 | Lof et al. | |
| 2010/0179704 A1 * | 7/2010 | Ozog | 700/291 |
| 2011/0060476 A1 * | 3/2011 | Iino et al. | 700/297 |
| 2011/0082596 A1 * | 4/2011 | Meagher et al. | 700/291 |
| 2011/0082597 A1 * | 4/2011 | Meagher | 700/291 |
| 2011/0106322 A1 | 5/2011 | Ou | |

* cited by examiner

*Primary Examiner* — Robert Fennema
*Assistant Examiner* — Anthony Whittington
(74) *Attorney, Agent, or Firm* — Daniel J. Jenkins

(57) ABSTRACT

A computing architecture that facilitates autonomously controlling operations of a microgrid is described herein. A microgrid network includes numerous computing devices that execute intelligent agents, each of which is assigned to a particular entity (load, source, storage device, or switch) in the microgrid. The intelligent agents can execute in accordance with predefined protocols to collectively perform computations that facilitate uninterrupted control of the microgrid.

19 Claims, 10 Drawing Sheets

COMPUTING ARCHITECTURE FOR AUTONOMOUS MICROGRIDS

CROSS-REFERENCE TO RELATED APPLICATIONS

This application claims priority to U.S. Provisional Patent Application Ser. No. 61/419,966, filed on Dec. 6, 2010, and entitled "AGENT-BASED INFORMATICS FOR AUTONOMOUS MICROGRIDS", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Relatively recently, there has been a push to rethink how electric power is provided to consumers of such power. Conventionally, relatively large power plants burn fossil fuels to provide electric power to consumers. Typically, these power plants are controlled by private entities that bill consumers as a function of an amount of power utilized by the consumers over some time period. Of growing concern with respect to these types of power systems is the pollution that is generated by such systems, as well as the centralized nature of such systems. For example, if a natural disaster or other unexpected event occurred that caused a power system to be destroyed or temporarily go off-line, undesirable consequences may occur. For instance, millions of people may go months, or even years, without electric power if one of such conventional power systems is disabled.

In an attempt to reduce carbon emissions and other pollutants caused by these conventional power systems, distributed power systems that employ renewable energy to generate electric power have been manufactured and deployed. These types of power systems include, but are not limited to, wind turbine farms, hydro-turbines, solar panel fields, geothermal power systems, and the like. While these types of systems offer a promising alternative to the conventional power grid, there are numerous deficiencies corresponding to such systems. First, these types of systems generally output variable amounts of power over time, dependent upon time of day, weather conditions, etc., rendering it difficult to meet changing demands of consumers. Additionally, these types of systems tend to be less efficient than the conventional power systems that burn fossil fuels, and the cost of building such systems tends to be relatively high. Further, such systems remained centralized, in that if a natural disaster or other unexpected event causes one of such systems to be disabled, numerous consumers that are provided with power generated by such systems would be negatively impacted.

To overcome at least some of the deficiencies set forth above, microgrids have been theorized, wherein a microgrid comprises a plurality of independently owned electric power sources that are configured to provide electric power to consumers in an area that is local to the sources of the electric power. In an example, a neighborhood may comprise a plurality of houses, at least some of which have solar panels attached to their respective rooftops, and one or more of which has a micro-wind turbine attached thereto. Yet another home in the neighborhood may have a micro-gas turbine generator that can burn natural gas to generate electric power. Each of these power sources can be independently owned and operated by homeowners in the neighborhood. In the ideal case, these power sources can supply all of the power required by the electric power consumers in the neighborhood. Due to the fact that the power sources generate variable amounts of power over time, and that loads (homeowners in the neighborhood) consume variable amounts of power over time, complexities exist that heretofore have prevented microgids from becoming deployed on a wide scale.

SUMMARY

The following is a brief summary of subject matter that is described in greater detail herein. This summary is not intended to be limiting as to the scope of the claims.

Described herein are various technologies pertaining to a distributed, decentralized software and hardware architecture that facilitates controlling the operation of an autonomous microgrid. A microgrid is a local power grid that comprises a plurality of sources owned and operated by different entities, wherein some of such power sources produce variable amounts of electric power (e.g., some of the power sources may be solar panels, wind turbines, or the like.). Similarly, loads that are provided power by the aforementioned sources can request varying amounts of electric power over time. For example, a homeowner will request more electric power in the summer to run air conditioning than in the fall. Thus, a microgrid can be confined to a particular region, such as a one-square-mile region, a five-square-mile region, a twenty-square-mile region, a three hundred square-mile region, or the like.

Conventional Supervisory Control and Data Acquisition (SCADA) systems with Human-in-the-Loop decision processes are not suitable for microgrids, as such systems are unable to determine timely actions for the number of independent generation and load sources in a microgrid. The software architecture described herein is decentralized and operates with significantly less human intervention when compared to conventional power grids, and thus includes distributed intelligence and fine-grained coordination activity via networked computer systems on the microgrid. In a distributed decentralized architecture, responsibility for harmonizing power production and consumption falls to some combination of computing devices participating on the grid at any instant in time. Multi-agent systems (MAS) technology can be employed to develop collective decision functions and interaction protocols that can be employed to harmonize competing and common interests across loads and sources in the microgrid, as well as to coordinate actions of a heterogeneous society of intelligent computer-executable agents.

As mentioned above, the microgrid may include power sources that generate varying amounts of power over time, such as wind and solar power sources, and such sources can desirably provide electric power to independently-determined and variable loads. Intelligent computer-executable agents can be configured to represent electric power flow in a microgrid as two partially controllable, aggregate, stochastic processes: a first one for sources in the microgrid, and a second one for loads in the microgrid, which are harmonized through power balance by the computer-executable intelligent agents. The stochastic control, planning, and scheduling functions, which are employed to harmonize the requests for electric power from loads and the provision of electric power from sources, are distributed in an intelligent multi-agent system that conducts its operations securely and correctly on various timescales from sub-second to annual.

The prediction of collective electric power output by sources in the microgrid and the collective electric power requested by loads in the microgrid can be computed by way of model-predictive control (MPC), which refers to computer control systems that employ system models to predict future states of a system in response to, commands and disturbance inputs. At each future time horizon, an MPC algorithm can compute the desired optimal system response to anticipated disturbances based on a current system state and a system model, and then determines substantially optimal command sequences to achieve desired performance. In a distributed microgrid system, the model-predictive control algorithms can be distributed across multiple computing devices and conducted by a multi-agent system using advanced interaction protocols that employ numerical and knowledge-based analytical models of the electrical and control systems in the microgrid.

A plurality of different types of intelligent agents can be employed in connection with the aforementioned distributed software architecture. In an example, each power source in the microgrid can have a computing device respectively assigned thereto, wherein the computing device is configured to execute a generation agent, which is an intelligent computer-executable agent that is configured to facilitate computation of collective predicted electric power output by numerous sources, some of which are variable in nature, at different time horizons. In an example, the computing device assigned to any particular source of electric power in the microgrid may control a power electronics device, such as a transformer, a DC-DC converter, a DC-AC inverter, or the like. Based upon a plurality of factors, including goals of the respective power source, constraints on the power source, costs and benefits of taking various actions with respect the power source, etc., an intelligent generation agent for the power source can compute a predicted amount of electric power to be output by the power source at various future points in time (future time horizons), or future time intervals. This generation agent can be configured to communicate with other generation agents assigned to other sources of electric power in the microgrid by way of standardized protocols, and collectively, these agents can perform distributed computing tasks that result in the computation of an aggregate amount of power predicted to be output by the electric power sources in the microgrid. This aggregate amount of electric power at varying time horizons constitutes an estimated power schedule and can be represented to loads in the microgrid as a virtual power generator. Further, such aggregate amount of power (at different times) can have a probability distribution as well as a mean and variance corresponding thereto, such that a risk of relying upon this predicted amount of electric power can be assessed through a suitable risk calculation or function.

Similarly, loads in the microgrid can have computing devices assigned thereto that are configured to execute intelligent load agents, which individually can compute a predicted amount of power that will be utilized by its respective load over various time horizons in the future. Each intelligent load agent assigned to a particular load in the microgrid can ascertain requisite amounts of power needed by the load (e.g., the load may be a house, and the amount of power may be an amount sufficient to power a refrigerator or a hot water heater), and can compute predicted amount of requested load as a function of historic requested load, one or more weather conditions, explicit models of the individual power devices making up the load, etc. The intelligent agents can output their predicted power requirements at various time horizons and can receive predicted power requirements from other loads in the microgrid. The intelligent load agents may then act in conjunction to compute an aggregate amount of electric power at varying time horizons in the future through distributed computing protocols. If the laws of physics are broken, i.e., more power is requested then is predicted to be available outside some acceptable risk, then the intelligent load agents may undertake negotiations to reduce power requirements by certain loads in exchange for some defined or negotiable benefit, such as a billing reduction or other suitable incentive.

Additionally, microgrids can be coupled together by way of electric transmission lines that are controlled by way of one or more switches. The switches can have a processor and memory therein that are configured to execute intelligent transmission agents, which can represent the needs of respective microgrids and negotiate with other microgrids for electric power. Pursuant to an example, the collective predictions of load agents and generation agents in a first microgrid may indicate that an electric power surplus over an interval of time in the future is available for distribution to at least one other microgrid, while a second microgrid may have a deficit of electric power over an overlapping time interval. The intelligent transmission agents can utilize such information to negotiate transmission of electric power between connected microgrids. Other agents that are configured to perform other types of functionality will be described in greater detail herein.

Other aspects will be appreciated upon reading and understanding the attached figures and description.

DETAILED DESCRIPTION

Figure 1:
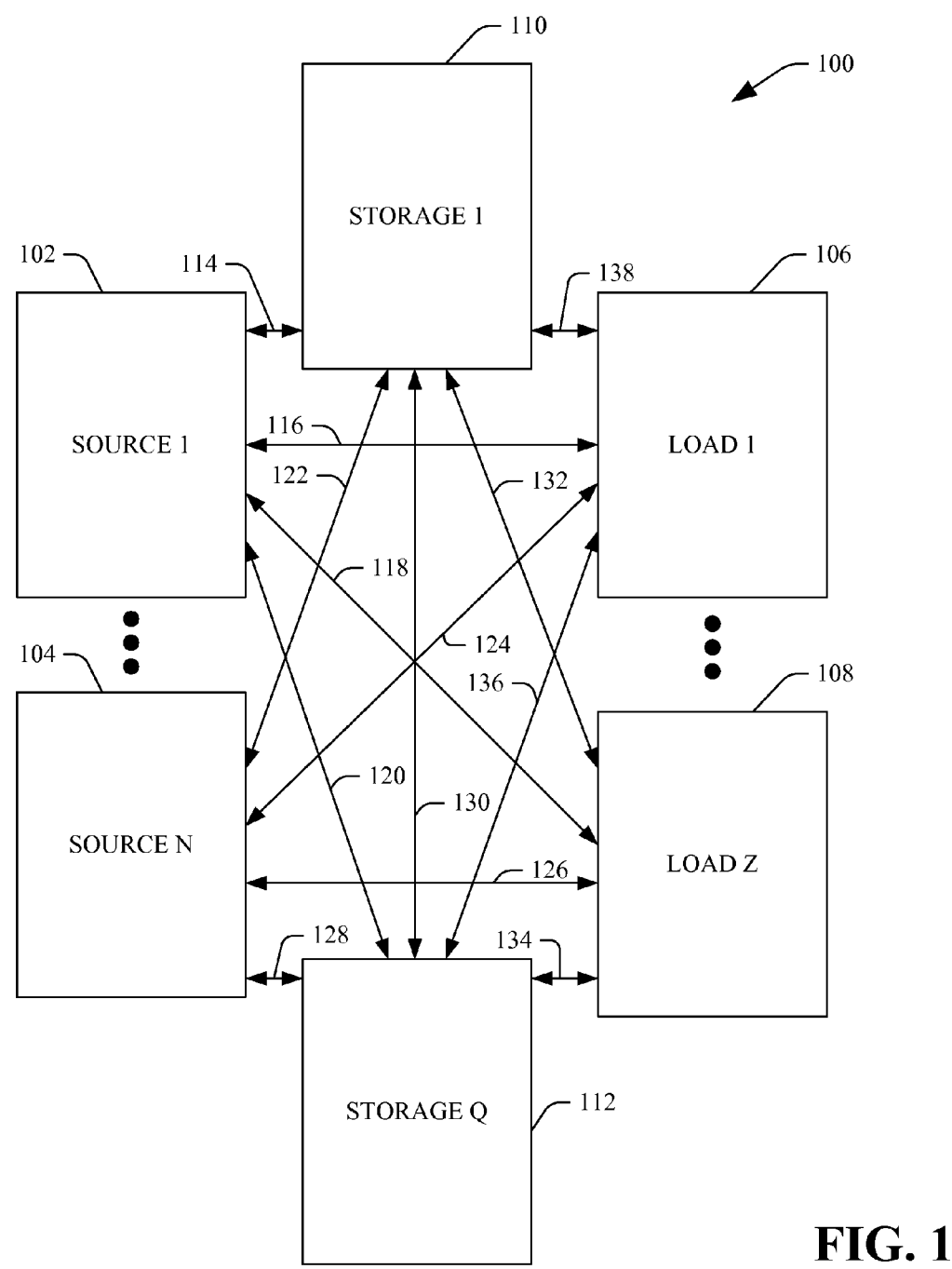
FIG. 1 is a block diagram of an exemplary microgrid.

Various technologies pertaining to a computing architecture that can be employed in connection with an autonomous microgrid will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component", "agent", and "system" are intended to encompass computer-readable data storage that is configured with computer-executable instructions that cause certain functionality to be performed when executed by a processor. The computer-executable instructions may include a routine, a function, or the like. In another example, a "component", "agent", or "system" may be hardware that is configured to perform certain functionality, such as a field programmable gate array (FPGA), an embedded processor interfaced to a power control hardware device, or the like. It is also to be understood that a component, agent, or system may be localized on a single device or distributed across several devices.

Described herein are various technologies pertaining to a distributed software and system architecture that can be employed in connection with controlling operations of power electronics in a microgrid. A microgrid, as the term is used herein, can refer to a collection of electric power sources (including energized storage devices) and electric power loads (including de-energized storage devices) and associated control systems, wherein at least some of the electric power sources are independently owned and operated, and the electric power loads are likewise independently owned and operated. Additionally, a microgrid, as the term is used herein, has a geographical constraint associated therewith, such that, for example, a microgrid may be confined to one square mile, five square miles, ten square miles, twenty square miles, etc. In an ideal scenario, the power sources in the microgrid provide sufficient power to supply the needs of the loads in the microgrid. In a microgrid, however, electric power sources may include power sources that are configured to output variable amounts of electric power over time, such as solar panels, wind turbines, geothermal power systems, or the like. Similarly, the loads in a microgrid will request varying amounts of electric power at various different points in time. Microgrids may also be connected to the bulk power grid to provide power when generators and storage elements are unavailable.

In an exemplary embodiment, a microgrid may cover a portion of a city, wherein a subset of homeowners, business owners, etc. in such portion of the city purchase systems that are configured to generate electric power, including, but not limited to, systems that utilize renewable energy to generate electric power, such as solar panels, micro-wind turbines, etc. Other homeowners, businesses, or the like in the microgrid may purchase and operate micro gas turbine generators that are configured to burn natural gas, for example, to output electric power. The businesses or homeowners may choose the type of electric power generation system to deploy in the microgrid based upon, for example, incentives set forth by the community for provision of electric power. Generally, it is desirable for these electric power sources in the microgrid to fully satisfy power requirements of the loads in the microgrid (the portion of the city). The requests for electric power from the loads will vary over time, such that more electric power is collectively requested from the loads at certain times of day, days of week, seasons, etc., than others. Because the sources of electric power are individually owned and operated in the microgrid, conventional centralized Supervisory Control and Data Acquisition (SCADA) systems are not well-suited for controlling the generation and provision of electric power. This is because, for example, at any single point in time, an owner of a source of electric power may choose to pull such source off-line, may modify behavior of the electric power source, etc. Further, such conventional SCADA systems are not scaleable. Specifically, owners of homes or businesses may at any time wish to add an electric power source to their building due to, for example, some incentive for being a provider of electric power. The distributed software architecture described herein is a scalable architecture that allows for plug and play of different electric power sources, including storage elements, as well as electric power loads, including storage elements, in a microgrid.

The software architecture described herein essentially decentralizes the SCADA function and operates with significantly less human interaction and intervention than what is associated with the current power grid and thereby includes a significantly greater amount of distributed intelligence and fine-grained coordination activity via networked computer systems. Additionally, without the traditional omnipotent central authority and with so many independent loads and sources under disparate custodial control, responsibility for harmonizing power production and consumption falls to some requisite combination of members participating on the microgrid at any instant in time. Therefore, the software architecture described herein leverages advanced multi-agent system (MAS) technology to implement collective decision functions and interaction protocols to harmonize the competing and common interests of the microgrid, as well as coordinate actions of a heterogeneous society of autonomous computer-executable intelligent agents. The software architecture also takes into consideration the fact that the microgrid will include power sources that generate varying amounts of power over time, such as wind and solar, which interact with independently determined, variable loads, thereby resulting in a stochastic power flow process in which both load and generation elements are uncertain and have to be adjusted concomitantly to regulate voltage and power flow. Accordingly, intelligent agents that are described in greater detail herein represent electric power flow in a microgrid as two partially-controllable, aggregate, stochastic processes, one for sources and one for loads, harmonized through power balance by an intelligent, adaptive agent system. Stochastic control and stochastic programming (planning and scheduling) functions are distributed into a multi-agent system that conducts its operations securely and correctly on various time scales from sub-second to annual.

Intelligent agents in the aforementioned decentralized software architecture can employ model predictive control (MPC) technologies to generate predictions of power flows from the loads and sources across varying time horizons. MPC refers to computer control systems that use system models to predict the future state of a system in response to commands and disturbance inputs. At each future time horizon, an MPC computer-executable algorithm can compute an expected system response to anticipated disturbances based on its current state and its system model and can determine a substantially optimal command sequence to achieve desired performance. The first act in the sequence of commands becomes the current input, and the process repeats for the next time horizon. In the decentralized system described herein, the multi-agent system can utilize decentralized adaptive MPC technologies based on advanced interaction protocols utilizing knowledge-based analytical models of elemental, electrical, and control systems in the microgrid.

In general, the software architecture described herein leverages advanced MAS technology to develop collective decision functions pertaining to electric power, interaction protocols required to harmonize competing and common interests of portions of the microgrid, and coordinate actions of a heterogeneous society of autonomous computer-executable intelligent agents. Various theories and technologies are available from this body of research for establishing norms, policies, plans and coordination schemes, and among highly interactive computational processes (agents). In general, a coherent multi-agent system exhibits a central tension between private goals of an individual agent, presumably to obtain some benefit, and goals it shares with entire membership. The behaviors of individual agents are subject to certain liberties (autonomy), within which an individual agent is free to take actions to achieve its private goals, as well as certain responsibilities (interdependence), which places requirements on individual behaviors for achieving common goals and minimizing interference. To deploy such a multi-agent system, individual and shared goals and values of members can be defined, and benefits can be defined that accrue to individuals and to the membership at large. Additionally, behaviors can be defined that will achieve such goals, ensure the benefits, and reflect the proper values of the membership.

As mentioned above, the loads and sources output and request time-varying amounts of electric power. Power sources that generate varying amounts of power, interacting with independently-determined variable loads, result in a stochastic power flow process, in which both load and generation elements are uncertain and must be adjusted concomitantly to regulate voltage and power flow. Accordingly, as described herein, stochastic processes are employed to represent all generation, load, and transmission characteristics and are utilized as a mathematical basis for analysis of stability, adequacy, cost, and risk. Intelligent agents can be configured to collectively perform stochastic prediction and control actions under various microgrid configurations using interactive coordination protocols that adjust the balance of generation and load in relatively small increments. The core result of decentralized predictive power scheduling for a heterogeneous microgrid is a family of adequacy or capacity density functions computed at each time period, and the corresponding indices that enable the collective control group to predict the future near-term risk of inadequate power, determine (negotiate) admissible corrective actions, and reallocate generation or load resources through collective decision protocols. The performance indices can be conditioned on system characteristics, such as amount and distribution of dispatchable and non-dispatchable power sources, the state of power storage devices, individual and aggregate load and source density functions, local decision algorithms, and information network characteristics, such as communication latency. Within each possible microgrid configuration, deviations in the nameplate characteristics and parameters of loads, storage, and generators can introduce disturbances affecting short-term voltage stability and requiring closed loop regulation to correct.

Exemplary electrical architecture and agents are now described. A single equipotential bus can be viewed as an electrical energy commons populated by n distinct autonomous agents. The primary common process is variable energization, which is the flow of electrical energy among the membership. A bus has a simple model: a parallel connection of current sources and admittances. Under a voltage-regular equipotential node, time-varying stochastic admittances represent a power demand of a load, and time-varying stochastic input currents represent a power contribution of a source. Electrical properties of primary agents can be described by canonical one port or two port network models. Physical interconnection of these agents can define the electrical architecture of a microgrid or of interconnected microgrids, as will be described in greater detail below. In the software architecture described herein, there can be five instantiable subclasses of agent: generation agents, load agents, storage agents, (which can be collectively referred to as energy agents), as well as connection agents and transmission agents (which can be generally referred to as interconnection agents). By abstracting the electrical characteristics of the agent-controlled hardware into canonical form, circuit and electrical network theorems can be leveraged to enable agents to collectively reason about the composite electrical network, connect and disconnect to vary the circuit topology, and control their respective currents and admittances to achieve desired voltage and power operating points. In the aforementioned multi-agent architecture, electrical connections from energy agents to the bus are mediated by the collective actions of the connection agents, which can be referred to as the connection cohort. Each generation, load, or storage agent can be connected to the common bus through a single dedicated instance of a connection agent controlling an access switch. An instance of the class bus $B_k$ can be defined by a set of instances of connection agents and can be collectively referred to as the bus cohort or connection cohort, which is essentially a parallel connected n-port bus. Connection agents can monitor the common bus voltage and individual currents flowing in and out of their respective energy agents and can share measurements resulting in complete observability of the bus state within the cohort.

The instantaneous composition of the bus can be determined by the state (open, closed) of each connection agent. Connection agents can connect or disconnect from their respective energy agents resulting in positive control of the bus membership within the cohort. Thus, the collection agents collectively are a locus of safety and security functions, connecting authorized and well-behaved energy agents and disconnecting unauthorized, malicious, or faulty energy agents.

A microgrid can be defined by a bus and its membership, which is the sets of instances of the generation agents, load agents, and storage agents. A set of all instances of generation agents can be referred to as a generation cohort, a set of all instances of load agents can be referred to as a load cohort, and a set of all instances of storage agents can be referred to as a storage cohort. A microgrid has an associated communications domain through which all classes of agents share information. Buses or microgrids can be interconnected through one or more instances of the class transmission agent. A transmission agent connecting two buses can bridge both communication domains. The set of instances of the transmission agent forms the transmission cohort, which is responsible for interconnection of microgrids and management of higher-level topology of the grid. This design reflects the realization of a variable topology electrical network coordinated by cooperative actions of interacting intelligent agents imbued with explicit knowledge of electrical network theory and capable of performing circuit analysis and power flow control analysis on the composite network in real time.

The general function of the load cohort is to organize individual loads and depleted storage elements recruited from the storage cohort into a virtual load center. The general function of the generation cohort is to organize individual sources and adequately charged or energized storage elements recruited from the storage cohort into a virtual power plant. It can be noted that a transmission agent abstracts another bus or microgrid as a load or generator depending on the direction of power flow, and hence may be an adjunct member of the generation cohort or load cohort when buses (microgrids) are interconnected.

The aggregate future load admittance, a stochastic process described by a stationary or non-stationary density function or stochastic process, can be calculated by the load cohort and transmitted to the generation cohort. The aggregate supply density function or stochastic process is computed by the generation cohort and transmitted to the load cohort. Upon receiving the aggregate supply density, the load cohort can compute the net load density and capacity risk index. If the capacity risk is acceptable, the generation and load are accepted for the future time horizon of MPC controllers. If the capacity risk is unacceptable to the load cohort, given its composition of critical and elective loads for each load agent, an interactive negotiation protocol can be invoked. The conflict resolution protocols are complex and depend on policies for generation limits, critical load maintenance requirements, and many other operational and service related considerations. Generally speaking, the load cohort may shed load, including charging storage elements subject to future commitments for supplying power, or through negotiation among load cohort members willing to reduce their respective demands, or it can request the generation cohort to recruit storage agents to increase supply for the requested demand if the demand is close to critical load levels or the net demand is otherwise too risky. These interaction protocols proceed iteratively until a solution is obtained that satisfies the capacity risk index for load services. Such protocols can be relatively complex when considerations such as electrical stability, commitments to supply other microgrids, load prioritization, economic constraints, and complex storage devices are included in negotiation policies. Accordingly, decentralized interactive stochastic programming algorithms can be designed and implemented that enable the planning and scheduling functions within time constraints imposed by stability requirements, limited communications bandwidth, and computational power. This can be enabled through multi-agent coordination theory, theory of distributed algorithms, operations research and optimization functions—particularly stochastic power planning and advanced control theory.

A cellular power network (CPN) is a power grid composed of distinct interconnected autonomic microgrid units. A CPN is a radically decentralized electrical generation and distribution network, and a correspondingly decentralized computer network that manages such power network. Autonomic microgrids are the cells of a cellular power network (e.g. the unit micro-structure of the CPN). Each microgrid node pair can be connected through a single transmission agent represented as an interconnection that mediates power flow direction according to the respective needs of its two clients. The interconnection topology of a CPN is, itself, determined dynamically through interaction protocols enacted by the transmission cohort. The interconnection of autonomous microgrids presumes the following: 1) that transmission facilities are available and under a transmission agent control; 2) the local power needs of a microgrid are not adequately met by local resources at all times; and 3) some microgrids have excess power that can be provided to other microgrids without reducing its capacity risk margin or causing instabilities. Interconnections may be time-varying on various timescales resulting in an ever-changing dynamic topology. For example, certain microgrids that rely heavily on variable local wind and solar resources desirably obtain power during specific times during the day, the week, the season, or year. As the composition of a microgrid changes through additional loads or generators, the interconnection schedules may change as well.

Moreover, under complex concomitant faults within microgrids, the transmission cohort may conduct contingency analysis protocols and decide to disconnect or connect certain microgrids to prevent cascading failures. Hence, interactions and negotiations among microgrid agent cohorts and the respective transmission agents that interconnect them is ongoing. The net result is a highly dynamic network system that exhibits emergent global stability, service to critical loads, resiliency, and recovery characteristics. It can be ascertained that through proper specialization of transmission agent functionality, a cell representing the legacy utility grid can be included, enabling the incremental addition of cellular power network subnetworks to the existing grid structure.

With reference now to FIG. 1, an exemplary microgrid 100 is illustrated. The microgrid 100 comprises a plurality of power sources 102-104. As mentioned above, one or more of the power sources 102-104 may be a power source that generates a varying amount of electrical power at different instances in time. That is, the sources 102-104 may include a solar panel, a micro-wind turbine, a micro gas generator turbine, or the like. In an example, the microgrid can comprise less than five thousand different power sources and less than one hundred thousand different loads.

The microgrid 100 additionally comprises a plurality of loads 106-108, wherein such loads may be loads in a residence, commercial building, factory, or business, particular machinery that requires electric power, etc. The amount of electric power requested by the loads 106-108 can vary depending upon human activities corresponding to such loads 106-108.

The microgrid 100 may also comprise a plurality of storage devices 110-112, wherein the storage devices 110-112 may be batteries, a capacitor bank, flywheels, pumped hydrodynamic system, or any suitable electronic or mechanical device that can retain and discharge energy as an electric current. Accordingly, if the sources 102-104 generate a surplus of electric power at any particular point in time, the storage devices 110-112 can be provided with excess power or energy. Alternatively, if the loads 106-108 are requesting more power than is being produced by the sources 102-104, then the storage devices 110-112 can act as sources, such that sufficient electric power is made available to the loads 106-108.

The microgrid 100 also comprises a plurality of electric buses or transmission lines 114-138 that are configured to transmit electric power from sources to loads and/or storage devices, as well as from storage devices to the loads 106-108. The microgrid 100 is shown as being a fully connected network, in that each load is individually connected to each source by way of a dedicated transmission line. This fully connected network is shown for exemplary purposes only, as generally in practice, numerous parallel and series connections between loads and sources will reduce the number of transmission lines needed to provide electric power to each requesting load in the microgrid 100.

To facilitate harmonization of power flows output by the sources 102-104, input to or output by the storage devices 110-112, and input to the loads 106-108, each of the sources 102-104 may have a computing device assigned thereto, each of the storage devices 110-112 may have a computing device assigned thereto, and each of the loads 106-108 may have a computing device assigned thereto. Pursuant to an example, the computing devices assigned to the respective elements of the microgrid 100 may be embedded with power electronic systems. For example, the source 102 may have a converter or transformer assigned thereto, and the computing device may be comprised by such converter or transformer. Similarly, the storage device 110 may have a sensor assigned thereto that is configured to sense an amount of charge that the storage device 110 is capable of retaining, an amount of charge available in the storage device 110, etc., and such sensor may comprise the aforementioned computing device that is assigned to the storage device 110. In yet another example, the load 106 may have a sensor assigned thereto that is configured to sense electric power flow being received by the load 106, and the computing device may be comprised by such sensor. In another exemplary embodiment, standalone computing devices may be placed in communication with the sources 102-104, the loads 106-108, and/or the storage devices 110-112. For example, a relatively powerful desktop computing device may be in communication with the source 102 and be configured to control at least one operating condition of the source 102. This computing device may be the computing device that is individually assigned to the source 102.

The computing devices assigned to the elements of the microgrid 100 may communicate with one another by way of a suitable network such as Ethernet, Wi-Fi, or the like. The network can enable relatively fast and secure communications between computing devices to allow for collective control of power flow amongst the microgrid 100 (as well as to other microgrids).

Each of the computing devices assigned to the elements of the microgrid 100 can have a processor and a memory, wherein the memory includes instructions that are executable by the processor. As has been alluded to above, the computing devices assigned to the sources 102-104 may have intelligent generation agents executing thereon, computing devices assigned to the loads 106-108 may have intelligent load agents executing thereon, and computing devices assigned to the storage devices 110-112 can have intelligent storage agents executing thereon. As will be described in greater detail below, any particular load agent executing on a computing device assigned to a particular load can be configured to predict an amount of power that will be consumed by the respective load over various instances in time in the future. This can be a stochastic prediction and can be associated with a probability distribution or mean and variance. Such computed data can be transmitted by way of the communications network and consumed by other load agents. These other load agents may then perform distributed computing operations utilizing predicted data from a variety of different loads to compute an aggregate load over various points in time in the future that is collectively requested by the loads 106-108 in the microgrid. Again, such computed predictions can be stochastic in nature, thereby enabling risk assessment to be undertaken with respect to such load.

Similarly, the computing devices assigned to the sources 102-104 may have intelligent generation agents executing thereon. Any particular intelligent generation agent is configured to compute a prediction for an amount of power to be generated by an electric power source over various points in time stochastically, again, with a distribution or a mean and variance. Such computing device may then output these predictions over the communications network, and they can be consumed by other generation agents on the network. Through distributed computing technologies, the generation agents can collectively and stochastically compute an aggregate amount of power to be output by the sources 102-104 in the microgrid 100 at varying time horizons. Such stochastic predictions for various time ranges in the future can be made available collectively to the load agents, which can analyze the risk of there being insufficient power. If there is insufficient power, power can be requested from the storage devices 110-112.

For example, the computing devices assigned to the storage devices 110-112 may have intelligent storage agents executing thereon that can be recruited by either the load agents or the generation agents to act as retainers of electric current or providers of electric current. For example, if the load agents collectively ascertain that the power sources 102-104 will output an insufficient amount of electric power to satisfy the needs of the loads 106-108, then the load agents can signal the generation agents, which may choose to recruit the storage agents to become generation agents, thereby allowing the storage devices 110-112 to act as sources.

Figure 2:
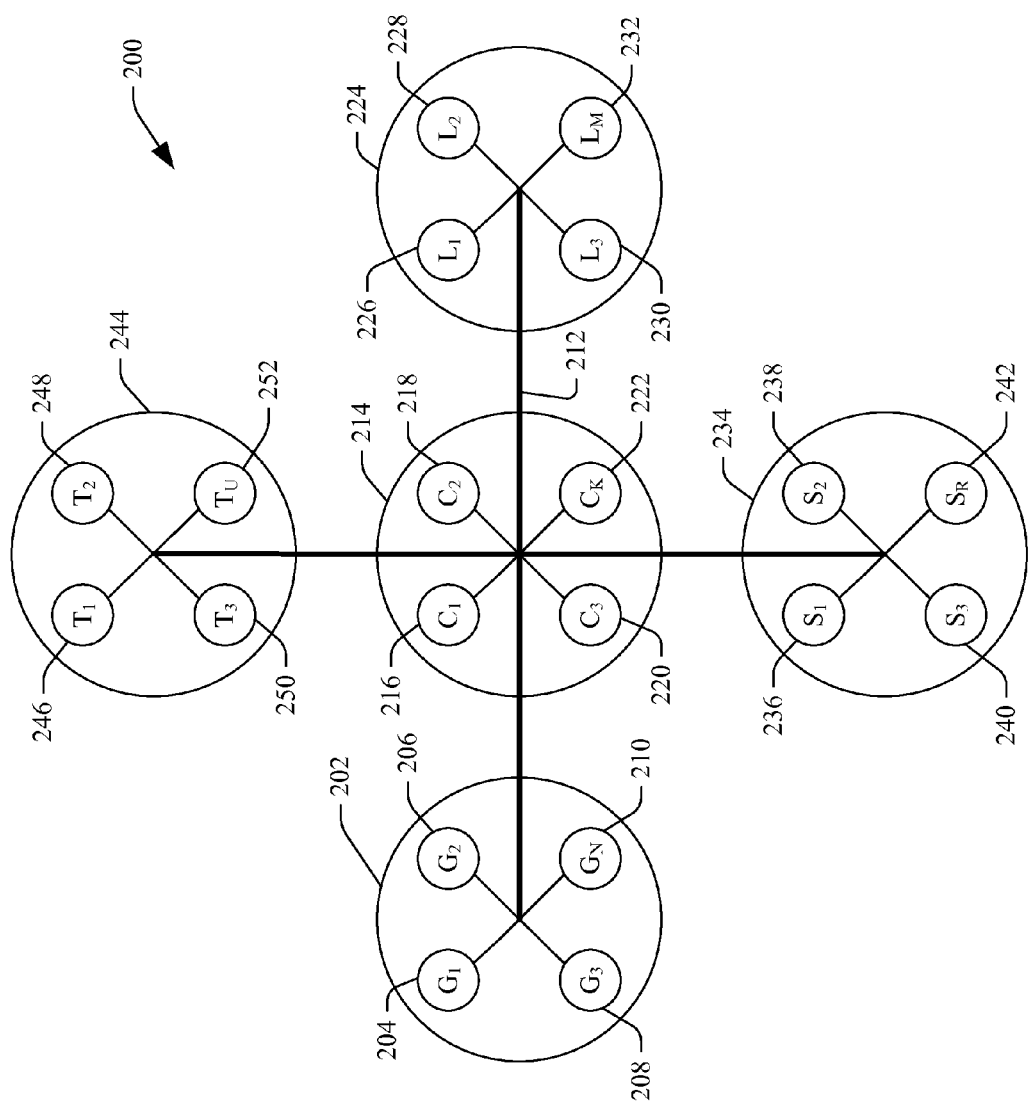
FIG. 2 illustrates a plurality of cohorts that include respective intelligent agents operating in conjunction to autonomously control a microgrid.

With reference now to FIG. 2, an exemplary system 200 that facilitates autonomously controlling a microgrid is illustrated. The system 200 comprises a generation cohort 202, which includes a plurality of generation agents 204-210. Each of the generation agents 204-210 reside respectively on computing devices that are assigned to sources in the microgrid 100. Accordingly, the first generation agent 204 executes on a first computing device that is assigned to a first source in the microgrid, the second generation agent 206 executes on a second computing device that is assigned to a second source in the microgrid 100, etc. The generation agents 204-210 are in communication with one another by way of a secure and fast network connection. As will be described in greater detail below, each generation agent in the generation cohort 202 can perform certain computations relative to the respective sources to which a generation agent is assigned. For instance, a generation agent may have knowledge of particular operating parameters of a power source in the microgrid, such that the generation agent is well-suited to predict an amount of electric power that will be output by the electric power source over various time horizons. Additionally, the generation agent may have knowledge of certain incentives corresponding to the source of electric power to which the generation agent is assigned, and may also have access to restrictions and incentives pertaining to the microgrid 100 as a whole. These incentives, goals, and restrictions can be defined in protocols.

Additionally, as mentioned above, the generation agents 204-210 in the generation cohort 202 can act in conjunction to perform one or more distributed computing tasks to meet a collective goal or analyze collective risks corresponding to power generation in the microgrid 100. In an example, the generation cohort 202 can compute a particular amount of electric power that is predicted to be output by each of the sources of electric power in the microgrid 100 in a distributed fashion with sufficient redundancy to ensure that if one or more of the generation agents were pulled offline, the computation could still be completed correctly. Each of the different sources of electric power in the microgrid 100 may output electric power at different levels (at different voltage levels and at different currents). The intelligent generation agents can take into consideration that loads on a bus that are to be provided with power from the electrical power sources operate at some standard voltage level. Accordingly, the generation agents can control various power electronic devices to cause a collection of electric power output by the sources to have the requisite power/voltage levels. When the generation cohort 202 computes stochastically an amount of predicted power to be output collectively by the sources of power in the microgrid 100, the generation cohort 202 can cause the amount of available power to be represented as a virtual bus 212. Such virtual bus 212 can appear to loads as a single power reservoir from which electric power can be drawn. Again, the amounts of electric power predicted by the generation cohort 202 to be generated by the sources in the microgrid 100 can be stochastic in nature, such that one analyzing the virtual bus can ascertain a probability distribution or a mean expected amount of electric power as well as a predicted variance. This allows individual loads in the microgrid 100 to perform a risk assessment when drawing from the virtual pool of electric power to ascertain if the pool capacity is adequate to meet desired and critical load levels.

The system 200 may further comprise a connection cohort 214 that includes a plurality of intelligent connection agents. The microgrid 100 may comprise a plurality of switches that act to couple sources and loads to a common bus or transmission lines that can be accessed by sources and loads respectively. These switches can have intelligent connection agents therein that can analyze data output by intelligent generation agents and load agents, and measure connection voltages and currents, to ascertain whether the respective sources and loads are desirably connected to the grid. The connection cohort 214 includes a plurality of connection agents 216-222. The connection agents 216-222 respectively act to mediate access to the virtual bus 212 by the other intelligent agents in the system 200. In other words, the connection cohort 214 acts to monitor and maintain the virtual bus 212, such that the intelligent connection agents 216-222 cooperate to mediate the membership of the virtual, bus 212.

The system 200 additionally comprises a load cohort 224 that includes a plurality of intelligent load agents 226-232. Each of the load agents 226-232, respectively, is executed in different computing devices assigned to loads in the microgrid 100. Therefore, the first load agent 226 executes in a first computing device that is assigned to a first load in the microgrid 100, the second load agent 228 executes in a second computing device that is assigned to a second load in the microgrid 100, and so on. Similar to the generation agents, the load agents 226-232 can operate to stochastically compute expected demands/requests of loads to which an intelligent load agent is respectively assigned. Therefore, for example, an intelligent load agent can stochastically predict electric power demands from a particular load based upon historic electric power use and contextual data, such as current time of day, day of week, season, etc. Accordingly, each intelligent load agent in the load cohort 224 can individually predict electric power demands of independent and varying loads in the microgrid 100. The load cohort 224 refers to the load agents 226-232 acting collectively in a distributed manner to compute an aggregate demand of the loads in the microgrid 100 stochastically over various points in time in the future. Furthermore, each of the intelligent load agents 226-232 can have a protocol corresponding thereto that defines goals corresponding to the individual load to which the intelligent load agent is assigned, incentives for reducing an amount of electric power utilized by a load, collective goals of the membership in the load cohort 224, etc., thereby allowing negotiation to be undertaken between intelligent load agents in the load cohort 224, as well as between the load cohort 224 and other cohorts in the system 200.

The load cohort 224 can access the virtual bus 212, analyze the stochastic prediction of power available on the virtual bus 212 as computed by the generation cohort 202, and can perform a risk analysis pertaining to the probability distribution of the net load or of the amount of excess power from the sources. The load cohort 224 can compare the desired collective and individual levels of risk with a risk index, which can define actions to be undertaken if the risk of not having sufficient power on the virtual bus 212 is too high. For instance, intra-cohort negotiations can be undertaken between intelligent load agents 226-232 to cause one or more of such load agents to reduce an amount of electric power that has been demanded by the load in the microgrid 100. Protocols utilized by the intelligent load agents 226-232 can allow the load agents to negotiate a reduction in demands for electric power for some incentive that is defined in the protocols, such as a greater reduction in an electric bill, additional electric power availability at later instances in time, and common stability requirements, amongst other incentives.

The system 200 further comprises a storage cohort 234 that includes a plurality of intelligent storage agents 236-242. The storage agents can be executed on computing devices that are assigned to electric power storage devices in the microgrid 100. For example, the first storage agent 236 can be executed by a first computing device that is assigned to a first electric power storage device, the second storage agent 238 can be executed by a second computing device that is assigned to a second electric power storage device, and so on. A storage agent can monitor an electric power storage device such as a battery, a capacitor bank, or the like and ascertain an amount of electric current that the storage device is capable of retaining and discharging over time. Further, the storage agent can monitor the storage device to determine an approximate amount of energy and power that the storage device currently holds, as well as maintain a schedule of commitments for a predicted amount of electric energy and power that the storage device will hold in the future. Again, this can be a stochastic computation, such that an intelligent storage agent can undertake a probabilistic analysis with respect to an amount of electric charge that will be retained by the electric power storage device at various time horizons in the future. The storage cohort 234 can utilize distributed computing technologies to collectively compute a virtual power store that maintains excess power to smooth variations in supply and demand over different time scales, while managing the life-cycle properties of individual storage elements. Therefore, in an example, one or more storage agents may be temporarily recruited into the generation cohort 202 if the power device corresponding to such storage agent is required to provide power to the virtual bus 212 and such storage device has sufficient energy and tower to meet the demand. Similarly, a storage agent may be temporarily recruited to be a portion of the load cohort 224 to consume excess power or if the storage device requires energization to fulfill a future generation role in the generation cohort 202.

The system 200 can further comprise a transmission cohort 244 that includes a plurality of intelligent transmission agents 246-252. A transmission agent can execute in a computing device that is assigned to some transmission medium between the microgrid 100 and another microgrid. Individually, a transmission agent can monitor power flow surplus and deficiencies in the virtual bus 212 and can communicate with other microgrids as to the exchange of electric power for compensation or future power needs, for example. In other words, microgrids can be interconnected by a particular virtual transmission agent, which brokers the flow of power between two microgrids, so long as their joint supply/demand function satisfies their local economic constraints, stability requirements, and demand profiles. Either microgrid can terminate the exchange of power in response to changing local conditions, subject to contractual obligations and contingency plans. With respect to a microgrid providing electric power to another microgrid, the transmission agent can participate in the generation cohort protocols of the consumer microgrid, and the transmission agent can participate in the load cohort protocols of the supplier microgrid. When the microgrid receiving power no longer needs the excess power, links can be disconnected between the two microgrids, and the transmission agent can resign from the respective generation and load cohorts. The transmission agent is then free to broker other connections between microgrids.

Various protocols can be employed in connection with communications between agents in a same cohort, as well as agents across cohorts. Coordination protocols can be composed of a series of intra-cohort and inter-cohort sub protocols. Two major classes of such protocols can be planning protocols and execution protocols, wherein planning protocols attempt to harmonize future power flow and are generally computation-intensive involving iterative, stochastic, nonlinear optimization algorithms. Execution protocols can coordinate current actions and are generally communication-intensive, requiring fast port-to-port response times. Planning protocols generally result in a master coordination scheme for the microgrid over some time period that is enacted by an execution protocol.

Figure 3:
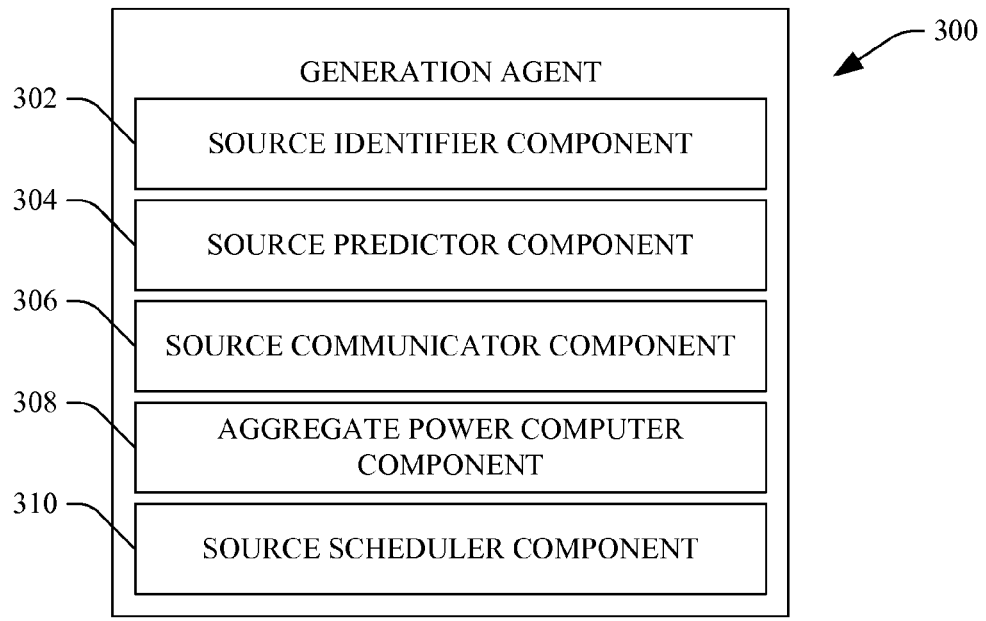
FIG. 3 is a functional block diagram of an exemplary generation agent.

With reference now to FIG. 3, a functional block diagram of an exemplary generation agent 300 that can be included in a generation cohort is illustrated. The generation agent 300 is an intelligent agent that can take into consideration alterations in an environment corresponding to the agent, define goals and risks, and can autonomously perform some decision-making process, based, at least in part, upon alterations in the environment, goals, and risks. The generation agent 300 comprises a source identifier component 302 that outputs signals pursuant to a predefined protocol upon the generation agent 300 being coupled to a microgrid computer network. As described above, electric power sources in a microgrid can change dynamically over time. That is, an owner of a source of electric power may desirably add the source of electric power at any point in time or remove the source of electric power from the microgrid at any given point in time. It is desirable that an electric power source be capable of being added to the network in a plug-and-play fashion, such that the microgrid need not be disabled or have its operations impeded when a new power source is added to the microgrid. The source identifier component 302 can output signals that indicate to other generation agents in a generation cohort of the existence of the generation agent 300, its corresponding electric power source, and other operational characteristics that allow the generation cohort to evaluate the advantages and risks of adding the source to the existing grid configuration. One or more other generation agents in the generation cohort can acknowledge the existence of the generation agent 300 and, for example, may negotiate certain operating contracts and assign certain computations to be undertaken by the generation agent 300 to further distribute complex power-related computations.

The generation agent 300 can additionally comprise a source predictor component 304 that can output predictions as to an amount of electric power that is to be generated by the power source corresponding to the generation component 300 at various future points in time. These future points in time may have a range of sub-second to annual. The predicted amounts of electric power to be generated by the source of electric power in the microgrid corresponding to the generation agent 300 can be stochastic in nature, such that a probability distribution or a mean and variance corresponding to the predicted values can be ascertained. The amounts of power can be predicted based upon a variety of factors, including historical amounts of power generated by the energy source such as wind speed and solar insolation and related weather conditions, time of day, season, etc., fuel reserves, electric power generation equipment, maintenance schedules, and economic factors. For instance, the generation agent 300 can predict amounts of power to be generated by the source across various time horizons based at least in part upon predicted position of the sun points in time in the future, expected cloud coverage at points in time in the future, expected wind speeds at points in time in the future, etc. The generation agent 300 can continuously compute the predicted electric power to be output by the source over various time ranges to ensure that decisions pertaining to load-balancing can be made quickly and accurately.

The generation agent 300 further comprises a source communicator component 306 that can communicate the predicted amounts of electric power that are to be output by the source to a plurality of other generation agents in the generation cohort. Various distributed system protocols including gossip protocols can be employed when ascertaining which agents are to receive the electric power predictions generated by the generation agent 300.

The generation agent 300 further includes an aggregate power computer component 308 that can perform a computation, or at least a portion of a computation, pertaining to an aggregate amount of electric power to be generated by all sources in a microgrid over various time horizons in a stochastic manner. Advanced distributed computing protocols can be employed when defining which computations are to be undertaken by which generation agents in the generation cohort, including fully redundant computation schemes in which all agents compute all aggregate and global cohort operating values and distributions. Additionally, redundancy may be built in, such that if any particular agent or set of agents goes offline, the microgrid will continue to operate properly. As mentioned above, the result of the collective computation of the aggregate amounts of electric power over various time horizons can be output as a virtual power bus that can be analyzed by a load cohort.

The generation agent 300 can additionally include a source scheduler component 310 that can schedule at least one action pertaining to the generation of electric power for the source. In an example, the source of electric power may be a gas driven micro turbine that generates electric power by burning natural gas. The source scheduler component 310 can have knowledge of a predicted amount of electric power that is available on the microgrid by renewable energy resources and can further have knowledge of a total demand for electric power by loads on the microgrid. This can be known over various time horizons and with particular certainties as output stochastically by the load cohort and generation cohort. Additionally, the source scheduler component 310 can take into consideration incentives for providing electric power at certain times while refraining from violating predefined restrictions for the microgrid. Therefore, for example, if there is a demand for electric power and the incentives for providing the electric power are sufficiently high, the source scheduler component 310 can schedule the gas driven micro turbine to begin generating electric power at certain periods of time.

Figure 4:
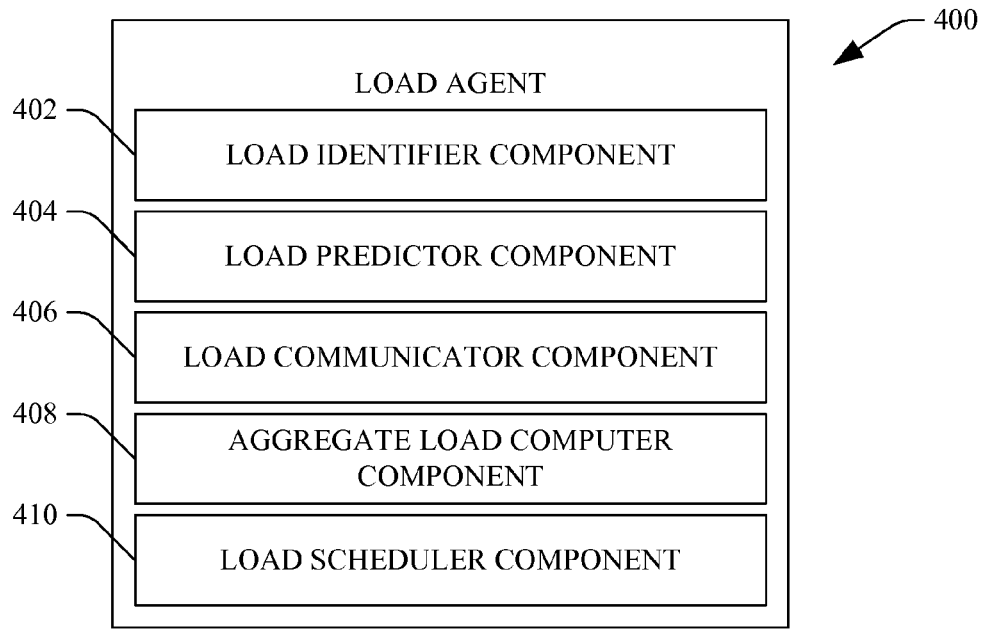
FIG. 4 is a functional block diagram of an exemplary load agent.

Referring now to FIG. 4, a functional block diagram of an exemplary load agent 400 that executes on a computing device that is assigned to a particular load in the microgrid 100 is illustrated. The load agent 400 comprises a load identifier component 402 that transmit signals to other agents on the network, the signals indicating the existence of the load agent 400 on the microgrid network. As with sources, in a microgrid, loads may be added and/or removed from the microgrid at various points in time. To facilitate plug-and-play functionality, the load identifier component 402 can transmit signals in accordance with an established communications protocol that indicates to other agents on the network the existence of the load agent 400 as well as data pertaining to the particular load that enables other agents to ascertain the effect of adding the load on the risk of instability and other global operating conditions. Pursuant to an example, the load cohort may then negotiate certain operating contracts and further distribute certain computations, such that the load agent 400 can aid in performing computations that are desirably distributed across agents in the microgrid network.

The load agent 400 further comprises a load predictor component 404 that can predict an amount of electric power that will be requested by the load over various time horizons stochastically. In other words, the load predictor component 404 can output predictions of amounts of power that will be requested by the load at several future instances in time. These predictions can have a probability distribution or mean and variance corresponding thereto. The prediction by the load predictor component 404 can be based upon a variety of parameters including, but not limited to, historic loads, current weather conditions, predicted weather conditions, specific models of the power-consuming devices (refrigerators, heaters, etc.), or the like.

The load agent 400 may also comprise a load communicator component 406 that communicates the stochastic predictions pertaining to the load output by the load predictor component 404 to other load agents on the microgrid network. The load communicator component 406 can utilize various distributed systems protocols such as gossip protocols when ascertaining which load agents to provide the stochastic predictions.

The load agent 400 also includes an aggregate load computer component 408 that performs at least one computation pertaining to a stochastic aggregate load request for all loads in the microgrid at various time horizons (multiple different points in time in the future). Advanced distributed computing protocols can be employed when defining which load agents in the load cohort desirably perform which calculations.

The load agent 400 also comprises a load scheduler component 410 that causes at least one parameter of a load to be scheduled at various future points in time. As described above, the generation cohort can output a stochastic prediction that indicates an amount of electric power that is available at different points in time. The load cohort can stochastically compute an aggregate demand for electric power across all loads on the microgrid. If the supply of power flow is greater than the demand (at some acceptable risk), then the load scheduler component 410 can schedule the load to receive the amount of electric power requested. If, however, there is a deficiency that is unable to be corrected by pulling electric power from storage or receiving power from another microgrid, then the load scheduler component 410 can employ an intra-load cohort protocol that negotiates an amount of electric power that is to be received by the load at various time horizons. For example, the intra-load cohort protocol may define incentives that can be achieved by dropping a demand for electric power, a minimum amount of electric power that must be received by the load to enable certain critical functionality, and the like, and can negotiate with other load agents to obtain an optimum trade-off between incentives and costs for the load while not violating any common limitations across members of the load cohort.

Figure 5:
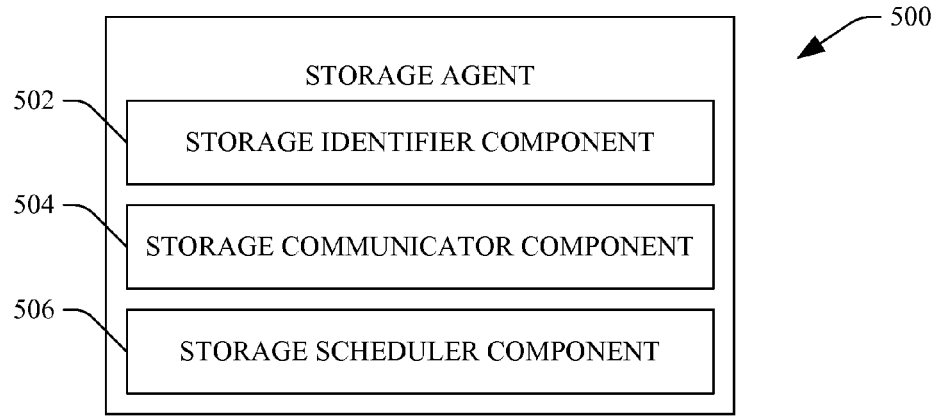
FIG. 5 is a functional block diagram of an exemplary storage agent.

Referring now to FIG. 5, a functional block diagram of an exemplary storage agent 500 is illustrated. The storage agent 500 can be configured to monitor and control operations of an electric power storage device on the microgrid. The storage agent 500 comprises a storage identifier component 502 that generates a signal in conformance with a predefined protocol that identifies to other agents on the microgrid network of the existence of the storage agent 500, as well as the electric storage device to which the storage agent 500 is assigned and other operational characteristics that enable the agents to evaluate the effect of adding the device to the membership, including improvements in risk and stability.

The storage agent 500 additionally includes a storage communicator component 504 that can communicate an amount of electric power available to the generation cohort and the load cohort (as well as to other storage agents), and can further output data that is indicative of an amount of power and energy that is retainable by the storage device. Given this information, both load agents and generation agents can determine how much additional power can be made available by way of storage devices and for how long such power can be made available by storage devices. Similarly, both the load cohort and the generation cohort can have knowledge of electric power that can be retained in the storage devices (how much the storage device has been depleted over time). The storage communicator component 504 can communicate with other storage agents the amount of electric power available and the capacity of the storage device, such that the storage cohort can compute an aggregate amount of electric power that is available by way of the storage devices on the virtual bus. While this computation can be somewhat deterministic, it may still be at least partially stochastic, as there is no precise certainty as to the amount of electric power that is available in the storage devices.

The storage agent 500 may also include a storage scheduler component 506 that schedules the storage device to discharge electric power or be provided with electric power based at least in part upon the supply and demand for electric power by the loads and generators in the microgrid, respectively. In an example, if the electric storage device corresponding to the storage agent 500 is partially depleted of energy, and at a future point time there is predicted to be a greater amount of supply of electric power than demand for electric power, the storage scheduler component 506 can schedule the storage device to be provided with excess energy. Of course, the converse may also occur where the demand for electric power is greater than the supply, in which case the storage scheduler component 506 can be scheduled to act as a source of electric power in the microgrid.

Figure 6:
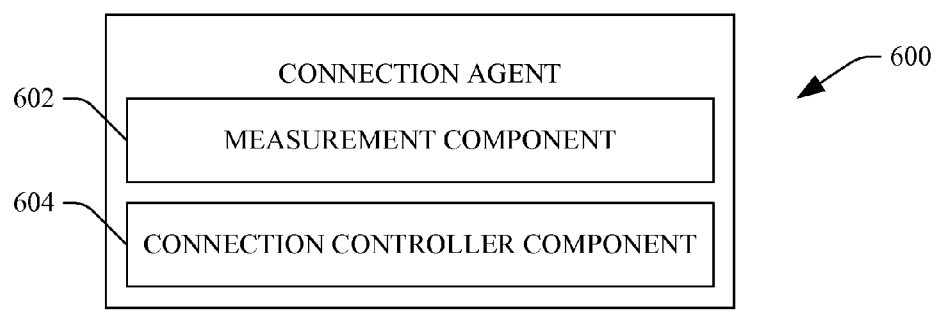
FIG. 6 is a functional block diagram of an exemplary connection agent.

Now referring to FIG. 6, a functional block diagram of an exemplary connection agent 600 is illustrated. Electric connections from generation agents, storage agents, load agents, and transmission agents can be respectively mediated by connection agents. In other words, each generation, load, storage or transmission agent can be connected to the bus through a single dedicated instance of a connection agent controlling an access switch. The connection agent 600 comprises a measurement component 602 that measures the common bus voltage and a current flowing from a connected load agent, generation agent, storage agent or transmission agent into or out of the bus. Connection agents can communicate with one another, indicating a total amount of current flowing into and out of the bus at any particular point in time. This results in complete observability of the state of the bus by the connection cohort.

The connection agent 600 further comprises a connection controller component 604 that can connect or disconnect its respective energy or transmission agent, resulting in controllability of membership to the bus. The connection controller component 604 can comprise safety and security functions, thereby connecting authorized and well-behaved energy agents and disconnecting unauthorized, malicious, or faulty energy or transmission agents.

Figure 7:
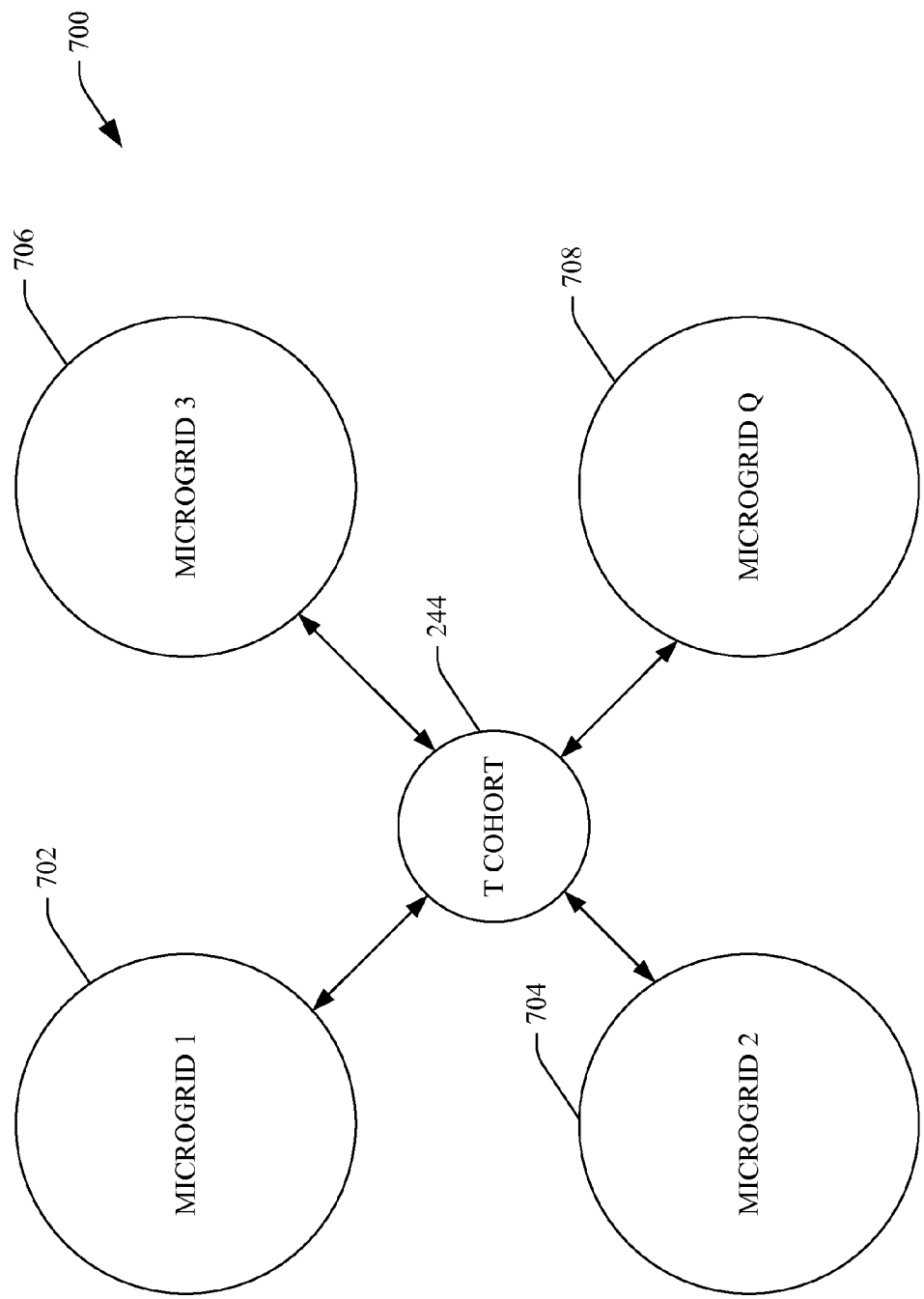
FIG. 7 illustrates an exemplary cellular power network, wherein electric power is exchanged between microgrids in such network through utilization of transmission agents.

Turning now to FIG. 7, an exemplary cellular power network 700 is illustrated. The cellular power network 700 comprises a plurality of microgrids 702-708. Physically, the microgrids 702-708 can be electrically coupled to one another by electric transmission lines. The transmission cohort 244 includes a plurality of transmission agents that independently control power flow between microgrids in the cellular power network 700 based upon supply and demand of electric power with respect to the microgrid 702-708. Power is shared between microgrids in the cellular power network 700 if such sharing can increase the stability of the cellular power network 700 as a whole. The transmission cohort 244 can receive data indicative of a net power surplus or deficit from any of the energy cohorts described above and can broker the transmission of electric power between microgrids as a function of such data. Electric connections between microgrids can be terminated subject to changing conditions (a certain microgrid becoming self-sufficient).

Figure 8:
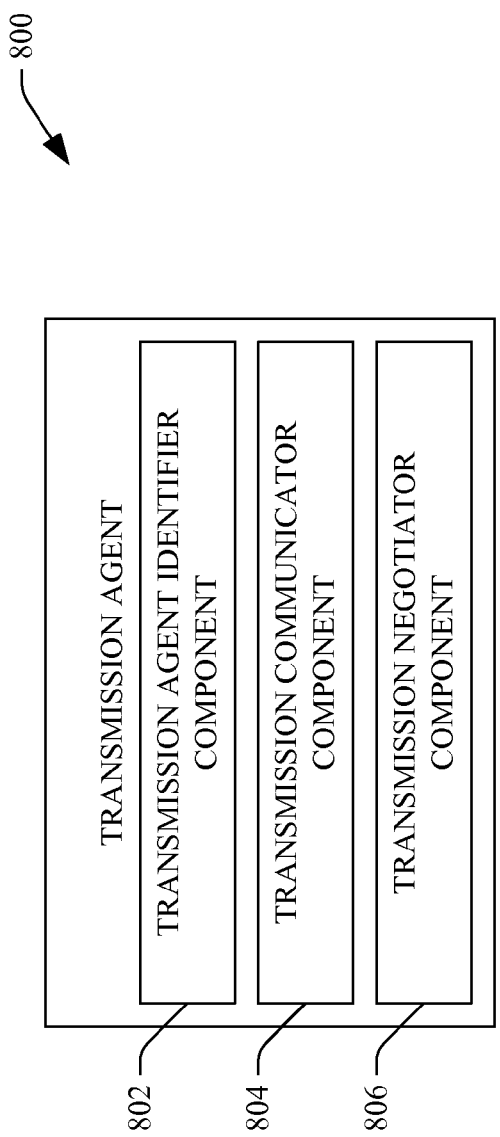
FIG. 8 is a functional block diagram of an exemplary transmission agent.

Turning now to FIG. 8, a functional block diagram of an exemplary transmission agent 800 that can be included in the transmission cohort 244 is illustrated. The transmission agent 800 can comprise a transmission agent identifier component 802 that is configured to output a signal that is indicative of the existence of the transmission agent 800 as well as the existence of an effective transmission path between two microgrids in a cellular power network. This facilitates plug-and-play functionality if a transmission path exists between two microgrids.

The transmission agent 800 further comprises a transmission communicator component 804 that can send and receive data to and from generation cohorts and load cohorts across multiple microgrids. Buses between microgrids are connected to by the transmission agent 800, wherein the transmission agent 800 bridges communication domains of the microgrids. The transmission agent 800 can further comprise a transmission negotiator component 806 that can negotiate electric power requests versus electric power supply across different microgrids in a cellular power network. For example, the transmission agent 800 can act in accordance with defined protocols that facilitate negotiating the power flow between two microgrids. The transmission negotiator component 806 can attempt to select desired transmissions amongst microgrids to improve the stability of the network while satisfying the local needs of microgrids in the cellular power network.

Figure 9:
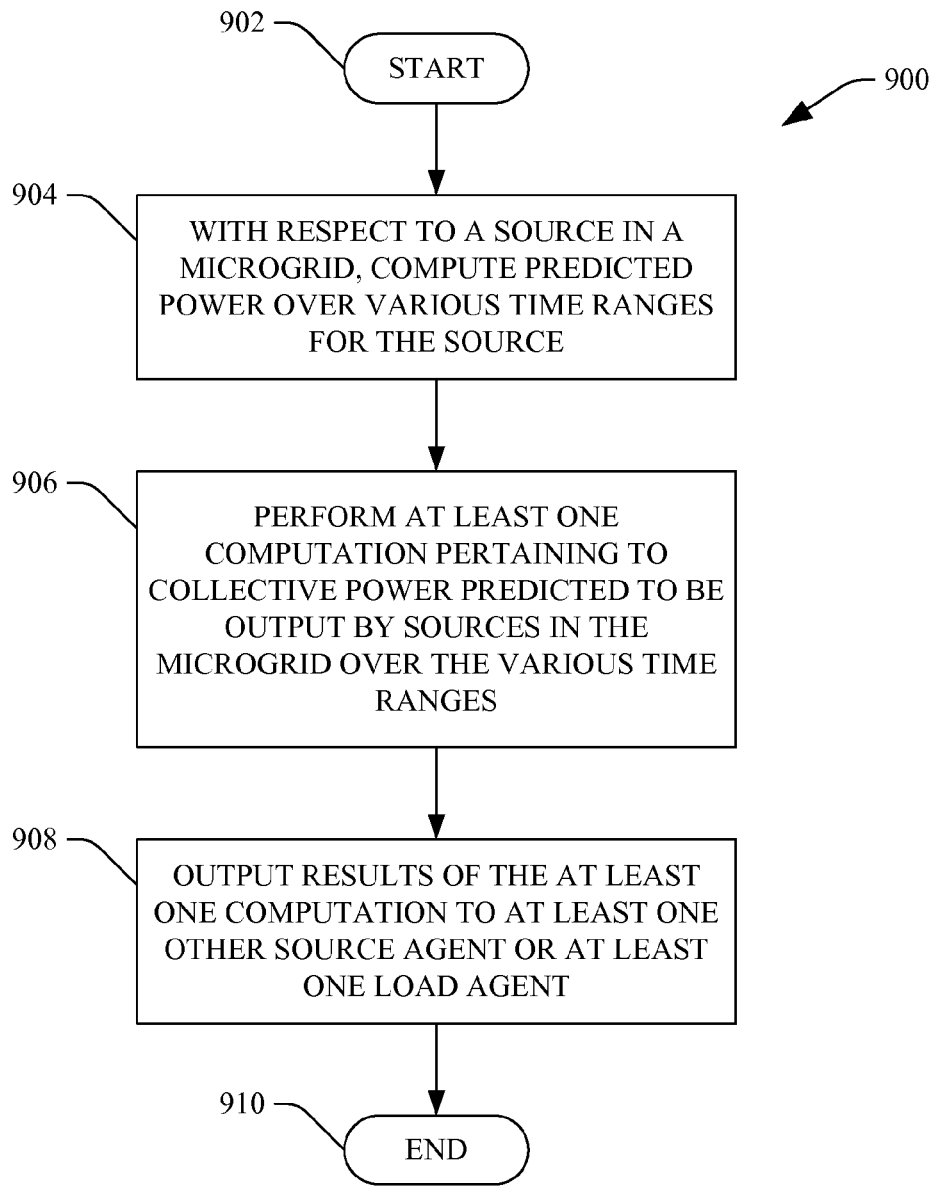
FIG. 9 is a flow diagram that illustrates an exemplary methodology that facilitates predicting stochastically an amount of power that will be output by sources on a microgrid over varying time horizons.
Figure 10:
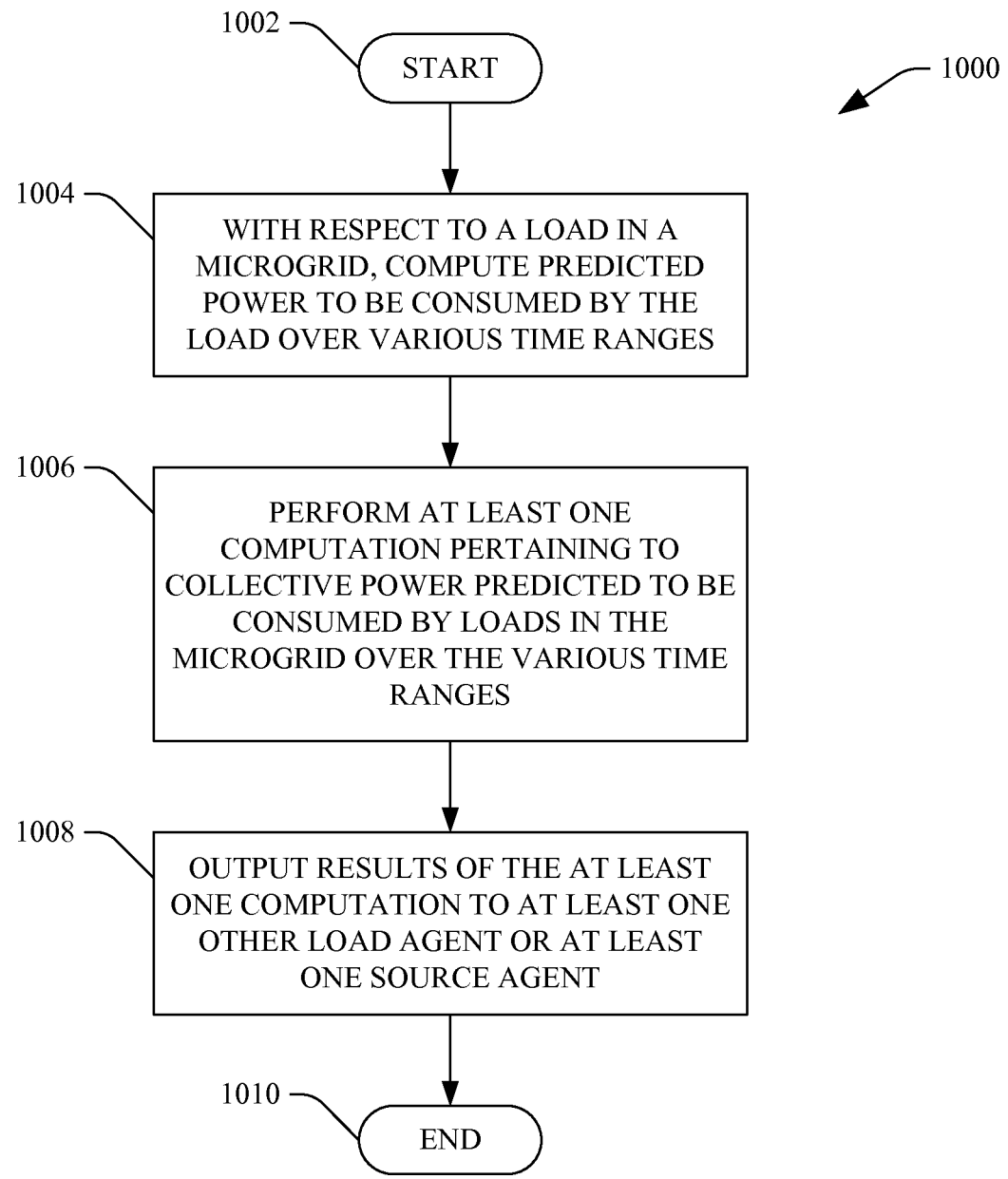
FIG. 10 is a flow diagram that illustrates an exemplary methodology for predicting an amount of electric power that will be desired by loads in a microgrid over varying time horizons.
Figure 11:
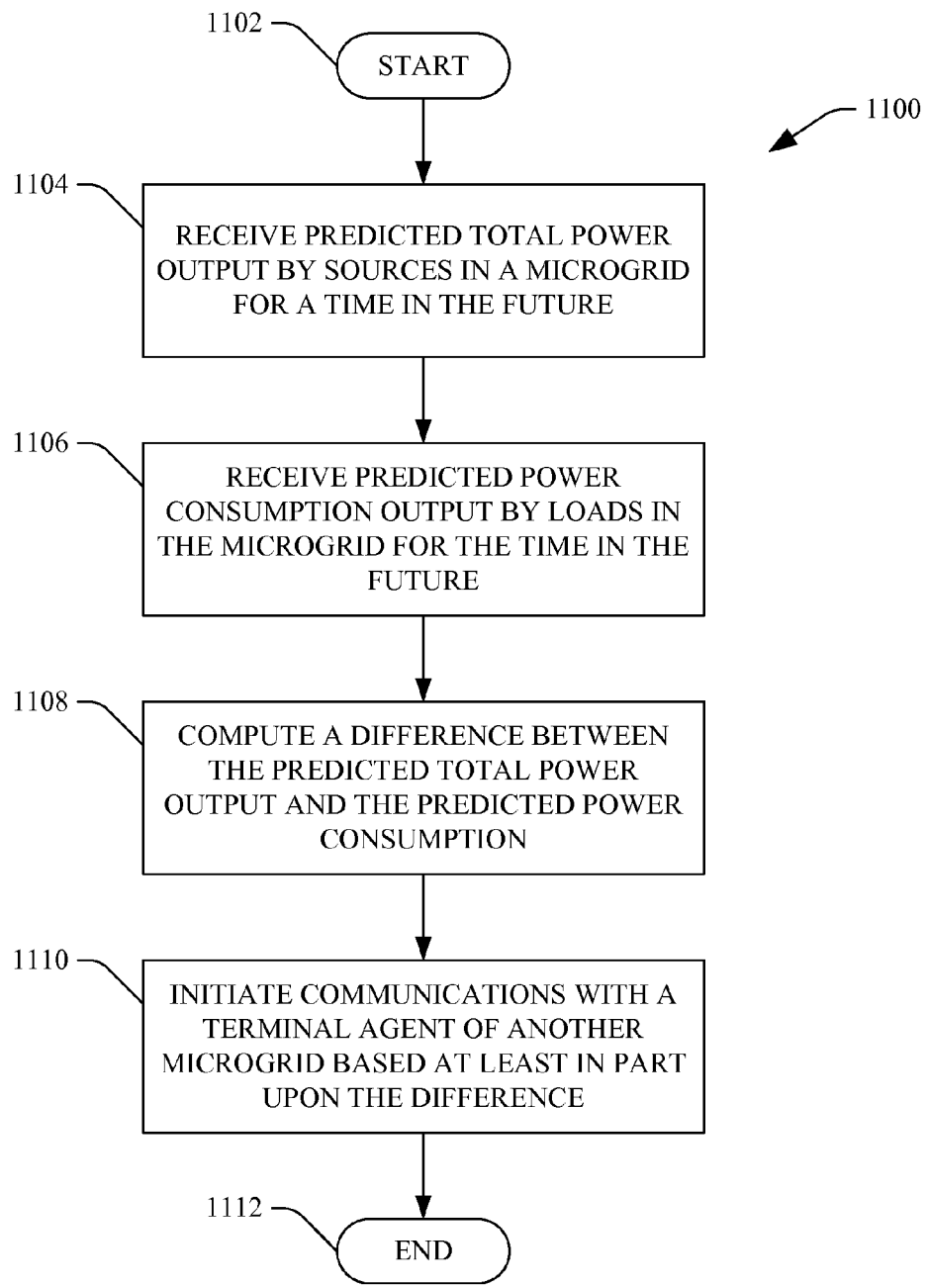
FIG. 11 is a flow diagram that illustrates an exemplary methodology for brokering exchange of electric power between microgrids in a cellular power network.

With reference now to FIGS. 9-11, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass any transitory forms of signal transmission, such as a propagated signal.

Now referring to FIG. 9, an exemplary methodology 900 that facilitates stochastically computing predicted amounts of electric power output by electric power sources in a microgrid at different points in time in the future is illustrated. The methodology 900 starts at 902, and at 904 with respect to a particular electric source in the microgrid, amounts of electric power that are to be output by the source in the microgrid are computed for various time ranges in the future. Additionally, data from computing devices assigned to a plurality of other power sources in the microgrid can be received, wherein the data pertains to amounts of power predicted to be output by the plurality of other power sources in the microgrid, respectively, at various future points in time.

At 906, based at least in part upon the received data and the predicted amounts of power determined at 904, at least one computation is performed by a processor pertaining to an aggregate amount of electric power predicted to be output by all sources in the microgrid over the various time ranges in the future. For instance, this at least one computation may be a portion of a distributed computation of an aggregate amount of power that is predicted to be output by the power sources on the microgrid over the various points in time in the future. Further, in an example, the processor may be a graphics processing unit (GPU), which is particularly well-suited for parallel computations.

At 908, results of the at least one computation are output to at least one other source agent or at least one load agent in the microgrid. For example, if the at least one computation is output to another source agent, such source agent can utilize the computation to further determine an aggregate amount of power that is predicted to be output by all electric sources in the microgrid. Alternatively, the computation may be the final predicted power to be output over the various time ranges and can be transmitted to a load for analysis. The methodology 900 completes at 910.

With reference now to FIG. 10, an exemplary methodology 1000 that can be undertaken at a computing device that is executing a load agent is illustrated. The methodology 1000 starts at 1002, and at 1004, with respect to a load in a microgrid, a predicted amount of power to be consumed by the load over various time ranges is computed. At 1006, at least one computation pertaining to a collective amount of power predicted to be consumed by all loads in the microgrid over the various time ranges is performed. At 1008, results of the at least one computation are output to at least one other load agent or at least one source agent in the microgrid network.

Now referring to FIG. 11, an exemplary methodology 1100 that facilitates controlling power flow within a microgrid and between microgrids in a cellular power network is illustrated. The methodology 1100 starts at 1102, and at 1104, a predicted amount of total power output by sources in a microgrid for a time in the future is received. At 1106, a predicted amount of power that is requested for consumption by loads in the microgrid for the time in the future is received.

At 1108, a difference between the predicted total power output by the sources and the predicted power consumed by the loads at the future point in time is computed. As mentioned above, the total power output and the total power that is predicted to be consumed can be stochastic in nature, such that some assessment of risk can be undertaken upon computing the difference between the predictions. In the case of power flow within a microgrid, the risk to the load cohort is evaluated and if the risk is unacceptable, storage recruitment is attempted by the generation cohort. If the available storage cannot reduce the risk to an acceptable level, transmission recruitment for power sharing among microgrids is attempted by the generation cohort. At 1110, a connection is brokered with another microgrid based at least in part upon the difference, such that power flow can be exchanged between different microgrids in a cellular power network. If transmission recruitment for power sharing cannot reduce the risk to an acceptable level, the load cohort can undertake a load-shedding protocol to reduce the risk to an acceptable level. The methodology 1100 completes at 1112.

Figure 12:
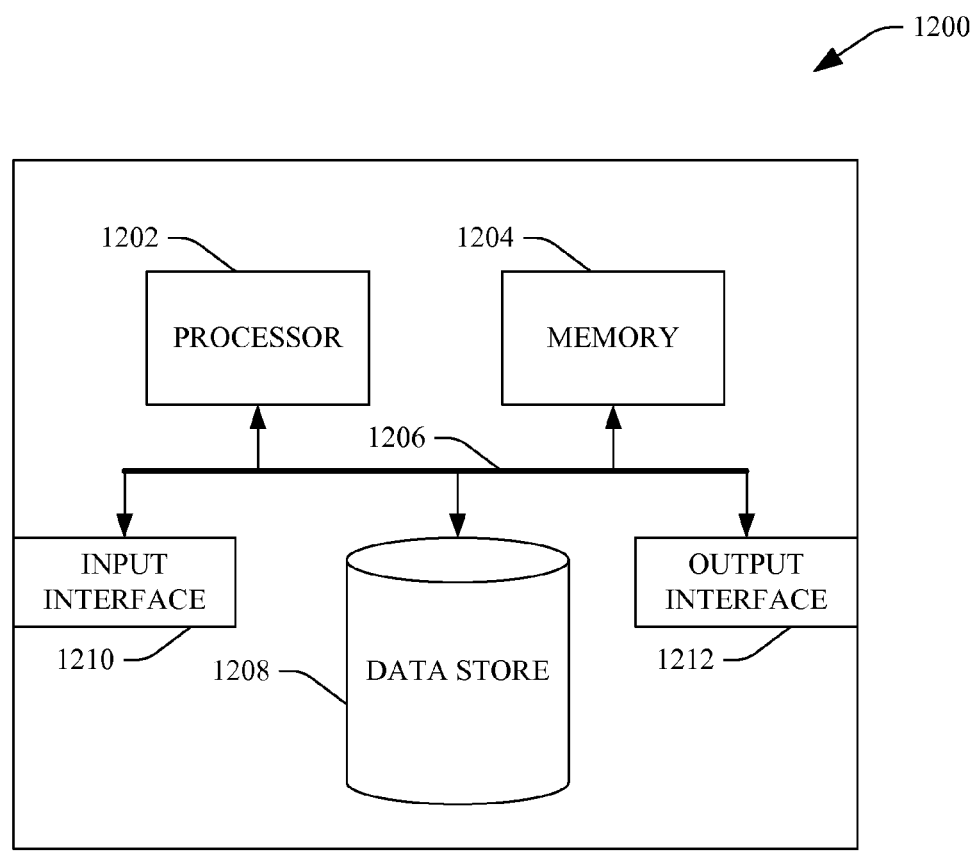
FIG. 12 is an exemplary computing system.

Now referring to FIG. 12, a high-level illustration of an exemplary computing device 1200 that can be used in accordance with the systems and methodologies disclosed herein is illustrated. For instance, the computing device 1200 may be used in a system that supports autonomously control operations of a microgrid. In another example, at least a portion of the computing device 1200 may be used in a system that supports brokering flow of electric power between microgrids. The computing device 1200 includes at least one processor 1202 that executes instructions that are stored in a memory 1204. The memory 1204 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store historic power usage data, operating parameters of devices in a microgrid, incentives for an individual entity and membership, etc.

The computing device 1200 additionally includes a data store 1208 that is accessible by the processor 1202 by way of the system bus 1206. The data store may be or include any suitable computer-readable storage, including a hard disk, memory, etc. The data store 1208 may include executable instructions, protocols, incentive's, risk indices, etc. The computing device 1200 also includes an input interface 1210 that allows external devices to communicate with the computing device 1200, including voltage sensors, current sensors, frequency sensors, temperature sensors, chemical sensors, humidity sensors, tamper sensors, switch contact sensors, GPS devices, meteorological devices, as well as communications-oriented devices such as serial or parallel data communications devices including network devices such as Ethernet controllers, and radio-frequency communications devices. For instance, the input interface 1210 may be used to receive instructions from an external computer device, a user, etc. The computing device 1200 also includes an output interface 1212 that interfaces the computing device 1200 with one or more external devices, including analog control devices, pulse-width modulation devices, stepper motor controllers, switch contact controls, as well as communications-oriented devices such as serial or parallel data communications devices including network devices such as Ethernet controllers, and radio-frequency communications devices. For example, the computing device 1200 may display text, images, etc. by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method configured for execution in a computing device in a microgrid, the computing device assigned to a particular power source in the microgrid, the method comprising:
   computing, for the particular power source in the microgrid, an amount of power predicted to be output by the particular power source at a future point in time;
   receiving data from computing devices assigned to a plurality of other power sources in the microgrid, the data pertaining to amounts of power predicted to be output by the plurality of other power sources in the microgrid, respectively, at the future point in time;
   causing a processor to compute and output a value that is indicative of a total amount of power predicted to be output collectively by the particular power source and the plurality of other power sources in the microgrid at the future point in time; and
   causing the processor to output a signal to a switch that controls current flow from the microgrid using a transmission line to another microgrid, the signal comprising data that is indicative of a difference between the total amount of power predicted to be output collectively by the particular power source and the plurality of other power sources in the microgrid at the future point in time and a total amount of power predicted to be consumed by loads in the microgrid.

2. The method of claim 1, wherein a power electronics device comprises the computing device in the microgrid.

3. The method of claim 2, wherein the power electronics device is one of a transformer, a DC-DC converter, a DC-AC inverter, an AC-DC converter, a thyristor, IGBT, or switch contactor.

4. The method of claim 1, wherein the particular power source is a power source that utilizes at least one renewable energy resource to generate power.

5. The method of claim 4, wherein the particular power source is one of a solar panel or a wind turbine.

6. The method of claim 1, further comprising causing the processor to compute data that is indicative of a mean of the total amount of power predicted to be output collectively by the particular power source and the plurality of other power sources in the microgrid at the future point in time and a variance of the total amount of power predicted to be output collectively by the particular power source and the plurality of other power sources in the microgrid at the future point in time.

7. The method of claim 1, further comprising:
   computing amounts of power predicted to be output by the particular power source at a plurality of different future points in time; and
   causing at least one other power source in the microgrid to alter at least one operating condition based at least in part upon the amounts of power predicted to be output by the particular power source at the plurality of different future points in time.

8. The method of claim 7, wherein the at least one other power source in the microgrid is one of a battery, a capacitor bank, or a gas turbine.

9. The method of claim 1, the microgrid comprising less than five thousand different power sources and less than one hundred thousand different loads.

10. The method of claim 1, the microgrid encompassing a geographic range of less than 300 square miles.

11. The method of claim 1, the computing device being a portion of a decentralized, distributed network, wherein computing devices in the decentralized, distributed network perform computations using multi-agent systems (MAS) technologies.

12. A system that facilitates autonomously controlling operation of a microgrid, the system comprising:
a computing device that is assigned to a source of power in the microgrid, the computing device comprising:
a processor; and
a memory that comprises a plurality of components that are executed by the processor, the plurality of components comprising:
a source predictor component that computes predictions of amounts of electrical power that will be output by the source of power in the microgrid across multiple points in time in the future;
a source communicator component that communicates the amounts of power that will be output by the source of power in the microgrid across the multiple points in time in the future that are predicted by the source predictor component to at least one other computing device that is assigned to at least one other source of power in the microgrid;
an aggregate power computer component that is configured to perform at least a portion of a distributed computation for an aggregate amount of power predicted to be output by sources of power in the microgrid, the sources of power in the microgrid comprising at least one power source that outputs a varying amount of electrical power over time; and
a transmission agent that outputs a signal to a switch that controls current flow from the microgrid using a transmission line to another microgrid, the signal comprising data that is indicative of a difference between the aggregate amount of power predicted to be output collectively by the particular power source and the plurality of other power sources in the microgrid at the future point in time and a total amount of power predicted to be consumed by loads in the microgrid.

13. The system of claim 12, the at least one power source that outputs a varying amount of electrical power over time being one of a solar panel or a micro wind turbine.

14. The system of claim 12, the computing device comprised by one of a DC-DC converter, a DC-AC converter, an AC-DC converter, an AC-AC converter, or a transformer.

15. The system of claim 12, the source predictor component computes the predictions of the amounts of electrical power that will be output by the source of power in the microgrid across multiple points in time in the future based at least in part upon position of the sun at the points in time in the future, expected cloud coverage at the points in time in the future, or expected wind speeds at the points in time in the future.

16. The system of claim 12, the computing device being a portion of a distributed computing system that autonomously controls operation of the microgrid.

17. The system of claim 12, wherein the source of power is a gas turbine, and wherein the plurality of components further comprises a source scheduler component that schedules an amount of power to be generated by the gas turbine at at least one point in time in the future based at least in part upon the collective amount of power predicted to be output by sources of power in the microgrid.

18. The system of claim 12, wherein the computing device operates in harmony with another computing device to generate a virtual power bus that is accessible to loads in the microgrid.

19. A non-transitory computer-readable medium comprising instructions that, when executed by a processor, cause the processor to perform acts comprising: accessing data pertaining to at least one weather condition at various future points in time; predicting amounts of electric power that are to be generated by a source of electric power in a microgrid at the various future points in time based at least in part outputting the amounts of electric power to a plurality of other computing devices that are assigned to other sources of power in the microgrid; receiving from the plurality of other computing devices that are assigned to the other sources of power data that pertains to a total amount of power to be generated by sources of electric power in the microgrid; performing at least one computation based upon the data received from the plurality of other computing devices, the at least one computation pertaining to a collective amount of power predicted to be available to loads in the microgrid at the various points in time; and outputting a signal to a switch that controls current flow from the microgrid using a transmission line to another microgrid, the signal comprising data that is indicative of a difference between the total amount of power predicted to be output collectively by the particular power source and the plurality of other sources of power in the microgrid at one of the various future points in time and a total amount of power predicted to be consumed by loads in the microgrid.

* * * * *